United States Patent [19]
Loyer et al.

[11] Patent Number: 5,418,786
[45] Date of Patent: May 23, 1995

[54] ASYNCHRONOUS TRANSFER MODE (ATM) METHOD AND APPARATUS FOR COMMUNICATING STATUS BYTES IN A MANNER COMPATIBLE WITH THE UTOPIA PROTOCOL

[75] Inventors: Bruce a. Loyer; Yaron Ben-Arie, both of Austin, Tex.

[73] Assignee: Motorola, Inc., Schaumburg, Ill.

[21] Appl. No.: 261,513

[22] Filed: Jun. 17, 1994

[51] Int. Cl.⁶ ............................................. H04L 29/10
[52] U.S. Cl. .................................... 370/94.2; 375/377
[58] Field of Search ............... 370/58.1, 58.2, 58.3, 370/60, 60.1, 94.1, 94.2, 110.1, 79; 375/7, 8, 121

[56] References Cited
U.S. PATENT DOCUMENTS 5,365,524  11/1994  Hiller et al. ..................... 370/94.2
5,375,121  12/1994  Nishino et al. .................. 370/94.2

*Primary Examiner*—Wellington Chin
*Attorney, Agent, or Firm*—Keith E. Witek

[57] ABSTRACT

An asynchronous transfer mode (ATM) layer (10) is coupled to one or more physical layers (PHY layer) (12) via a plurality of conductors (14 and 16). The conductors (14 and 16) allow bi-directional communication of ATM data cells between the layers (10 and 12) using the UTOPIA protocol. In addition, the ATM layer (10) and the PHY layer (12) can communicate one or more status bytes and one or more physical identification (PHY ID) bytes to each other prior to the communication of an ATM data cell. This addition of the communication of one or more status bytes and one or more physical identification (PHY ID) bytes is fully compatible with the currently accepted UTOPIA standard and therefore adds new ATM functionality without compromising the widely-accepted UTOPIA standard for ATM.

25 Claims, 1 Drawing Sheet

ASYNCHRONOUS TRANSFER MODE (ATM) METHOD AND APPARATUS FOR COMMUNICATING STATUS BYTES IN A MANNER COMPATIBLE WITH THE UTOPIA PROTOCOL

FIELD OF THE INVENTION

The present invention relates generally to data processing systems, and more particularly, to asynchronous transfer mode (ATM) method and systems which are used to transfer status bits.

BACKGROUND OF THE INVENTION

In asynchronous transfer mode (ATM) systems the UTOPIA protocol is used to communicate 53 byte ATM data cells between physical layers (PHY layers) and ATM layers. In many cases, more information needs to be communicated between the ATM layers and the PHY layers in the ATM system, but there is currently no method or protocol for doing so which is completely compatible and nondestructive to the existing and widely-accepted UTOPIA protocol. It would also be advantageous if any addition to an existing standard, such as UTOPIA, would not add new control signals or constraints and be flexible.

SUMMARY OF THE INVENTION

The previously mentioned disadvantages are overcome and other advantages achieved with the present invention. In one form, the present invention comprises an asynchronous transfer mode (ATM) protocol. The ATM protocol first transfers a plurality of status bytes between an asynchronous transfer mode (ATM) layer device and a physical layer device. Subsequent to the step of transferring the plurality of status bytes, an ATM data cell comprising a plurality of data bytes is transferred between the asynchronous transfer mode (ATM) layer device and the physical layer device after the step of transferring the plurality of status bytes wherein the assertion of a control signal identifies a beginning of the ATM data cell. In addition a physical identification number could be transferred between the plurality of status bits and the ATM data cell.

In another form, the invention comprises an asynchronous transfer mode (ATM) data processing system comprising an asynchronous transfer mode (ATM) layer circuit, a physical layer device, and a plurality of conductors. The plurality of conductors being coupled between the asynchronous transfer mode (ATM) layer circuit and the physical layer circuit. A subset of the plurality of conductors being used to communicate status bits between the asynchronous transfer mode (ATM) layer circuit and the physical layer circuit before the transferring of an asynchronous transfer mode (ATM) data cell which corresponds to the status bits.

In yet another form, the invention comprises an asynchronous transfer mode (ATM) protocol having a serial data stream which is eight bits wide and has: (1) at least one status byte which is used to communicate invalid physical identification information and ATM system status information between two devices in an ATM data processing system.; (2) a physical identification byte positioned in the serial data stream at a time after the communication of the at least one status byte; and (3) an ATM data cell positioned in the serial data stream at a time after the communication of the physical identification byte wherein the ATM data cell is used to communicate data bytes between the two devices in the ATM data processing system.

The present invention will be more clearly understood from the detailed description below in conjunction with the accompanying drawings.

Figure 1:
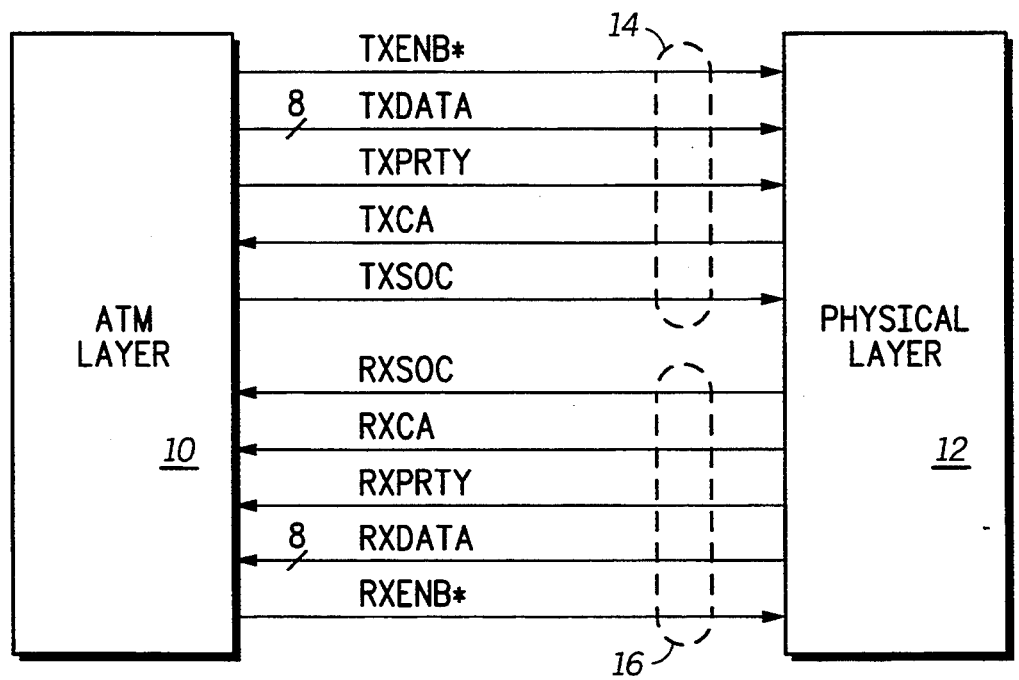
FIG. 1 illustrates, in a block diagram, an ATM data processing system in accordance with the present invention.

It will be appreciated that for simplicity and clarity of illustration, elements illustrated in the FIGURES have not necessarily been drawn to scale. For example, the dimensions of some of the elements are exaggerated relative to other elements for clarity. Further, where considered appropriate, reference numerals have been repeated among the FIGURES to indicate corresponding or analogous elements.

DESCRIPTION OF A PREFERRED EMBODIMENT

FIG. 1 illustrates an asynchronous transfer mode (ATM) system in accordance with the present invention. FIG. 1 illustrates an asynchronous transfer mode (ATM) layer 10 and a physical layer (PHY layer) 12. The layers 10 and 12 are coupled by a plurality of conductors which support the UTOPIA ATM protocol. The system of FIG. 1 is bi-directional in that ATM data cells may be transferred from the layer 10 to the layer 12 or from the layer 12 to the layer 10.

ATM data cell transfers from layer 10 to layer 12 occur through the plurality of conductors 14. Conductors 14 comprises a transmit enable signal (TxEnb*) which is active low due to the '*' symbol. The transmit enable signal is a control transmitted from the ATM layer 10 to the PHY layer 12 to indicate that an ATM data cell is to be transferred from layer 10 to layer 12. If the PHY layer 12 has open memory space and can properly receive the ATM data cell, then the PHY layer 12 will inform the ATM layer 10 that a transfer can be started by asserting a transmit cell available (TxCA) control signal which is received by the ATM layer 10. When transmitting the ATM data cell, the eight bit transmit data bus (TxData) is used to serially transfer an ATM data cell one byte at a time. In other implementations similar to ATM the eight bit size may be varied to any number of bits. In order to determine if the transfer occurred between the layer 10 and the layer 12 without data contamination, a transmit parity signal (TxPrty) is used to determine if the ATM data cell was properly transmitted. To indicate the start of the ATM data cell, the layer 10 asserts a transmit start of cell (TxSOC) control signal which indicates that the TxData lines are transmitting or preparing to transmit a first byte of the ATM data cell.

In many cases, the transfer discussed above is not entirely sufficient since additional information or addition communication is sometimes needed between the layer 10 and layer 20. The additional communication includes one or more of status bytes and/or a physical identification (PHY ID) byte. It is important that a system and method to transfer these additional bytes be easy to implement with UTOPIA and be fully compatible with UTOPIA so that the UTOPIA standard is not altered adversely in a noncompatible manner.

The above transfer is completely in accordance with the UTOPIA protocol. In addition to the above transfer, status bits/status bytes and a physical identification (PHY ID) may be transferred before the communication of the ATM data cell. This addition of bytes before the transmit of the ATM data cell in no way corrupts the operation of the UTOPIA interface and is fully compliant with UTOPIA which is an extremely advantageous. This transfer between layer 10 and 12 is fully discussed in FIGS. 2-3.

Figure 2:
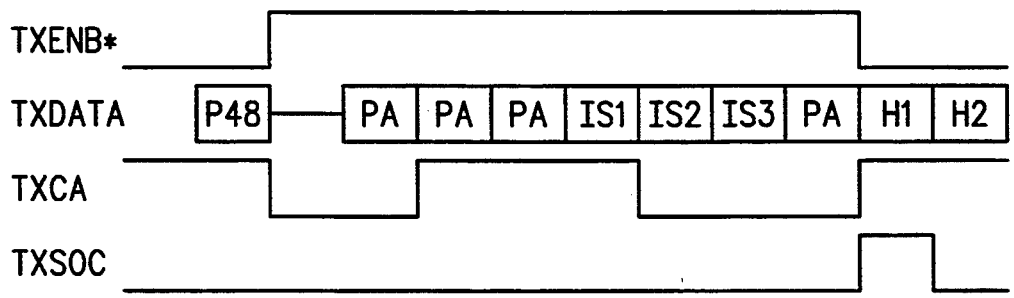
FIG. 2 illustrates, in a timing diagram, a transmit sequence in accordance with the present invention.
Figure 3:
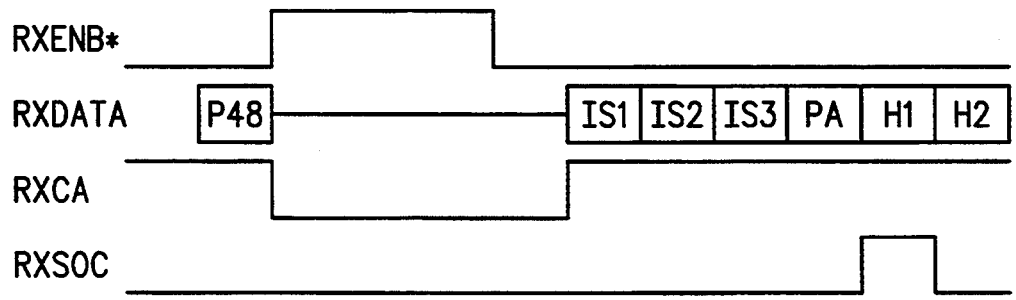
FIG. 3 illustrates, in a timing diagram, a receive sequence in accordance with the present invention.

In a preferred form, The ATM data cell transferred between the layer 10 and the layer 12 comprises 53 eight-bit bytes. A first four bytes contains header information which includes virtual path identifier (VPI) and a virtual connection identifier (VCI) to identify a communication path. Other information is also included in the header bytes. A fifth byte is a check redundancy code (CRC) which is used to ensure that the VPI and VCI data including other header information is properly transmitted. The next forty-eight bytes are called the payload wherein 48 eight-bit data bytes are transferred between the layers 10 and 12. These 48 bytes are associated with the header and the CRC. FIGS. 2-3 illustrated that one or more additional bytes are appended before the transmission of this data cell without compromising the UTOPIA interface.

In FIG. 1, an ATM data cell transfers from layer 12 to layer 10 occur through the plurality of conductors 16. Conductors 16 comprise a receive enable signal (RxEnb*) which is active low due to the "*" symbol. The receive enable signal is a control signal communicated from the ATM layer 10 to the PHY layer 12 to indicate that an ATM data cell is to be transferred from PHY layer 12 to ATM layer 10. Once the PHY layer 12 receives the asserted RxEnb* signal, layer 12 will transfer one ATM data cell to the ATM layer 10. When communicating the ATM data cell, the eight bit receive data bus (RxData) is used to serially transfer an ATM data cell (discussed above) one byte at a time. In other implementations similar to ATM the eight bit size may be varied to any number of bits. In order to determine if the transfer occurred between the layer 10 and the layer 12 without data contamination, a receive parity signal (RxPrty) is used by the ATM layer 10. To indicate the start of the ATM data cell, the layer 12 asserts a receive start of cell (RxSOC) control signal which indicates that the TxData lines are transmitting or preparing to communicate a first byte of the ATM data cell (which will be the first header data byte discussed above). The receive cell available (RxCA) is a control signal which is used in a manner similar to the TxCA. The RxCA is asserted in response to an asserted RxEnb* to indicate that an ATM data cell in the PHY layer 12 is complete and ready for transfer to the ATM layer 10.

FIG. 2 illustrates a byte-wide bit stream that is communicated from the ATM layer 10 in FIG. 1 to the PHY layer 12 of FIG. 1. All of the signals and buses plotted in FIG. 2 have been previously defined via FIG. 1. The TxData bus in FIG. 2 (which is typically eight bits wide to transmit byte sizes) is illustrated as communicating a plurality of serial ATM bytes which are abbreviated for simplicity. These abbreviations are defined as:

P48—is the 48th data byte (i.e. the last ATM payload data byte) which was transferred in a previous transfer between layer 10 and layer 12. It is important to reiterate that the ATM cell comprises fifty-three bytes time communicates sequentially in the following order from start to finish: four header bytes, one check redundancy code (CRC) byte and forty-eight ATM payload data bytes. P48 is the last ATM data cell byte of a previous transfer.

PA—is also referred to as a PHY ID and is a physical identification number which control routing of ATM data cells information through the layers 10 and 12.

IS# (wherein # is one through three in FIG. 2)—is an invalid physical ID which is viewed in the system of FIG. 1 as being a status byte. Any number of status bytes or status bits may be communicate in any size in the protocol taught herein.

H# (wherein H is a number one through four) indicates the first, second, third, and fourth header bytes which are the first-transmitted four bytes in any ATM data cell.

The TxEnb* is active low and is asserted at the beginning of the ATM data cell and remains asserted under the entire ATM data cell is transmitted. In other words, the TxEnb* signal is enabled for the communication of the first header byte (H1) in an ATM data cell and remains asserted until the P48 for this ATM data cell is communicated. The beginning of the ATM data cell is the identified by an asserted pulse communicated by the TxSOC signal as illustrated in FIG. 2.

The bytes which precede the H1 byte and therefore precede the entire ATM data cell are now further discussed. FIG. 2 illustrates that the ATM layer 10 can poll the PHY layer 12 any number of times (i.e., zero times, one time, or many times) before transmitting the status bytes (which may be one or more status bytes). This polling is done by keeping the TxEnb* deasserted while transmitting PA or PHY ID values on the TxData bus. This is illustrated in FIG. 2 via the fact that three serially provided PHY ID bytes labeled PA are provided in FIG. 2 via the TxData pins. Once polled the PHY layer 12 communicates to the ATM layer 10 whether space is available for storing an ATM data cell. If, in response to the PA poll, an asserted TxCA is received by ATM layer 10 from the PHY layer 12, then the ATM layer 10 can transfer the status bytes, PHY ID and ATM data cell to the PHY layer 12 as is further illustrated in FIG. 2. If no TxCA asserted pulse is returned by the PHY layer 12 in response to the ATM PHY ID (PA) polling, then the ATM cannot transfer an ATM data cell at this time due to the unavailability of space in the PHY layer 12.

Assuming that a TxCA is asserted in response to a poll, as illustrated in FIG. 2, the ATM layer proceeds by sending one or more status bytes or one or more status bits depending upon bus size (eight-bit data buses are the norm for ATM). The status bytes contain any type of information as to the status of connections, system errors, system information, configuration information and the like. Following the one or more status bytes (three status bytes are illustrated by example in FIG. 2) the PHY ID (labeled PA in FIG. 2 and sometimes called a link ID) is sent to identify data routing paths through which the ATM data cell is to be processed and transferred. Following the PA byte in FIG. 2, the entire ATM data cell is transferred in 53 serial byte transmissions as taught herein beginning with the header bytes H1–H4.

FIG. 3 illustrates a timing diagram which gives an example of a data cell transfer from layer 12 to layer 10. The abbreviations used for bytes in FIG. 3 are identical to the abbreviations used in FIG. 2 and are not further explained here. In addition, the signals identified in FIG. 3 are fully described above in FIG. 1. In FIG. 3 no initial polling is performed and status byte(s) are sent. Specifically three status bytes labeled IS1, IS2, and IS3 are illustrated in FIG. 3 although another number of bytes could be transmitted as status bytes. Following the status bytes, the PHY ID (referred to as PA in FIG. 3) is sent followed by the header, CRC, and the 48 data bytes wherein the 4 header bytes, the CRC and the 48 data bytes are referred to as the ATM data cell. In both FIG. 2 and FIG. 3, the pulse assertion of the TxSOC or RxSOC is performed in close proximity to the first header byte (H1) to denote the beginning of an ATM data cell.

In summary, an asynchronous transfer mode (ATM) method and apparatus is taught herein which allows status bytes and PHY ID values to be transmitted between layers while being fully compatible and nondestructive to the UTOPIA protocol. This invention transfers status bytes in such a way that no additional signals or control signals are not needed over and above what is already required/needed by UTOPIA and is completely backwards compatible with the previous versions of UTOPIA.

UTOPIA is a widely-accepted ATM interface that the ATM Forum group is using to interconnect the ATM layer to the PHY layer. It is currently defined as being one ATM layer connected to one PHY layer although multiple PHY layers could be coupled to one ATM layer in a Multi-PHY system. When a single ATM layer is coupled to a single PHY layer, the configuration is referred to a UTOPIA level 1. The method and apparatus taught herein are fully functional with UTOPIA level 1 or an expanded standard which allows multiple PHY layers to communicate with a single ATM layer. The relevant signals used in the ATM system and method taught herein are abbreviated herein once more:

1) TxEnb* is an active (low) which indicates that the ATM layer has data to send to the PHY layer. When this signal is inactive, the PHY layer for UTOPIA level 1 is suppose to ignore the other signals (i.e., not receive the other signals as part of an ATM data cell).
2) TxData is 8 bits of data for the PHY layer and the ATM layer.
3) TxCa is an active (high) signal which is used to indicate that the PHY has space to get a cell from the ATM layer.
4) TxSoc is an active (high) signal which indicates that the start of a cell (53 bytes) is on the TxData bus.
5) RxEnb* is an active (low) signal which indicates that the ATM layer is ready to receive a byte of data from the PHY layer. For UTOPIA level 1, this transfer does not really start until a RxSOC is received.
6) RxData is 8 bits of data originating from the PHY layer.
7) RxCa is an active (high) signal which indicates that the PHY layer has a new cell to give to the ATM layer.
8) RxSoc is an active (high) signal which indicates that the start of the cell (the first header H1) from the PHY layer to the ATM layer is on RxData.

In the method herein, asynchronous transfer mode (ATM) status bytes for an ATM data cell are sent during the time that normally the PHY identification (PHY ID) would be sent in previous ATM systems. The status bytes (one or more) are encoded as invalid PHY IDs (bit 7 is set) so that ATM implementations that do not support the sending of status bytes will simply ignore these status bits as invalid transmissions while ATM systems which support status transfers previous to the PHY ID will read these invalid PHY IDs as valid status bytes. Even in the case of level 1 UTOPIA (single PHY layers, not multiple PHY layers), the status bytes are sent at a time when the PHY layer (in the transmit direction) is ignoring the asynchronous transfer mode (ATM) data (i.e. ignoring any data on the TxData pins).

Herein, the Soc signal is a pulse signal which is normally low. This is the default condition which tells the PHY (or the ATM layer depending on direction [either receive or transmit]) that the cell transfer has not occurred yet and that either no useful information or PHY IDs/status bytes are being transferred. Therefore, the PHY layer does not have to support status transfers in order to work correctly with PHY layers that do support status transfers. This is advantageous since there will surely be a time when an old PHY layer (which does not support status bytes) will be connected to the same asynchronous transfer mode (ATM) layer as a new PHY layer (which supports status bytes). In this MULTI-PHY mode wherein some PHY layers support the status bytes and some do not, this UTOPIA nondestructive fully compatible method becomes very advantageous.

With this invention, invalid PHY IDs are used to send the status bytes (one or more) or status bits. There is no limit on the number or size of the status stream that can be sent. In addition, the receiving side will not confuse the PHY IDs with the status bytes so the receiving logic is simplified.

While the present invention has been illustrated and described with reference to specific embodiments, further modifications and improvements will occur to those skilled in the art. For example, any number of PHY IDs or status bytes can be sent. The PHY IDs can be sent before the status bytes. Although it is not shown in this embodiment, it is possible to send the status bytes or bits even when transmit cell available or receive cell available (TxCa or RxCa) do not become asserted and a cell is not transferred. The size of the busses can vary. The PHY layer 12 can consist of multiple PHY layers, each assigned a PHY ID. Control signals other than the controls signals illustrated in FIGS. 1-3 can be added herein. Other output paths are possible from the ATM layer 10 and the PHY layer 12 but were not illustrated for ease of explanation. This method and apparatus of transferring status bytes could be used for other communication protocols. Other bytes can be added to the data stream before the assertion of the SOC signal and the beginning of the ATM data cell transmission without affecting the methods discussed herein. In addition, it is possible to send status bits/bytes and a PHI ID without sending an ATM data cell. It is also possible to send streams of status bytes and PHY ID packages serially without communicating an ATM data cell. Furthermore, this multi-status communication without transferring an ATM data cell is very important for MULTI-PHY systems. It is to be understood, therefore, that this invention is not limited to the particular forms illustrated and that it is intended in the appended claims to cover all modifications that do not depart from the spirit and scope of this invention.

What is claimed is:

1. An asynchronous transfer mode (ATM) protocol comprising the steps of:

transferring at least one status byte from an asynchronous transfer mode (ATM) layer device to a physical layer device;

transferring a physical identification byte from the asynchronous transfer mode (ATM) layer device to the physical layer device after the step of transferring of the at least one status byte; and transferring an ATM data cell from the asynchronous transfer mode (ATM) layer device to the physical layer device after the step of transferring the physical identification byte wherein an assertion of a control signal identifies a beginning of the ATM data cell.

2. The asynchronous transfer mode (ATM) protocol of claim 1 further comprising the step of:

asserting a transmit enable signal which is output from the asynchronous transfer mode (ATM) layer device to the physical layer device to initiate the transferring of the ATM data cell.

3. The asynchronous transfer mode (ATM) protocol of claim 2 further comprising the step of:

asserting a transmit start of cell signal which is output from the asynchronous transfer mode (ATM) layer device to the physical layer device to identify a beginning of the ATM data cell.

4. The asynchronous transfer mode (ATM) protocol of claim 1 further comprising the step of:

asserting a transmit start of cell signal which is output from the asynchronous transfer mode (ATM) layer device to the physical layer device to identify a beginning of the ATM data cell.

5. The asynchronous transfer mode (ATM) protocol of claim 1 wherein the step of transferring an ATM data cell from the asynchronous transfer mode (ATM) layer device to the physical layer device comprises:

transferring the ATM data cell as a data cell which has a plurality of header bytes followed by a check redundancy code byte followed by forty-eight data bytes.

6. The asynchronous transfer mode (ATM) protocol of claim 5 wherein the step of transferring the ATM data cell as a data cell which has a plurality of header bytes followed by a check redundancy code byte followed by forty-eight data bytes comprises:

transmitting a virtual path identifier and a virtual connection identifier as a portion of plurality of the header bytes.

7. The asynchronous transfer mode (ATM) protocol of claim 1 wherein the step of transferring at least one status byte comprises:

transferring a plurality of status bytes which are eight-bits in width, each of the status bytes in the plurality of status bytes being transmitted in a serial fashion.

8. The asynchronous transfer mode (ATM) protocol of claim 1 further comprising the step of:

transferring an initial physical identification byte before the transferring of at least one status byte in order to determine if the physical layer device has memory space available for accepting the ATM data cell.

9. The asynchronous transfer mode (ATM) protocol of claim 1 further comprising the steps of:

transferring at least one status byte from the physical layer device to the asynchronous transfer mode (ATM) layer device;

transferring another physical identification byte from the physical layer device to the asynchronous transfer mode (ATM) layer device after the step of transferring of the at least one status byte; and transferring an ATM data cell from the physical layer device to the asynchronous transfer mode (ATM) layer device after the step of transferring the another physical identification byte wherein an assertion of a control signal identifies a beginning of the ATM data cell.

10. The asynchronous transfer mode (ATM) protocol of claim 1 further comprising the steps of:

transferring at least one status byte from the asynchronous transfer mode (ATM) layer device to the physical layer device;

transferring another physical identification byte from the asynchronous transfer mode (ATM) layer device to the physical layer device after the step of transferring of the at least one status byte; and transferring an ATM data cell from the asynchronous transfer mode (ATM) layer device to the physical layer device after the step of transferring the another physical identification byte wherein the assertion of a control signal identifies a beginning of the ATM data cell.

11. An asynchronous transfer mode (ATM) protocol comprising the steps of:

transferring at least one status byte from a physical layer device to an asynchronous transfer mode (ATM) layer device;

transferring a physical identification byte from the physical layer device to the asynchronous transfer mode (ATM) layer device after the step of transferring of the at least one status byte; and transferring an ATM data cell from the physical layer device to the asynchronous transfer mode (ATM) layer device after the step of transferring the physical identification byte wherein the assertion of a control signal identifies a beginning of the ATM data cell.

12. The asynchronous transfer mode (ATM) protocol of claim 11 further comprising the step of:

asserting a receive enable signal which is output from the asynchronous transfer mode (ATM) layer device to the physical layer device to initiate the transferring of the ATM data cell.

13. The asynchronous transfer mode (ATM) protocol of claim 12 further comprising the step of:

asserting a receive start of cell signal which is output from the physical layer device to the asynchronous transfer mode (ATM) layer device to identify a beginning of the ATM data cell.

14. The asynchronous transfer mode (ATM) protocol of claim 11 further comprising the step of:

asserting a receive start of cell signal which is output from the physical layer device to the asynchronous transfer mode (ATM) layer device to identify a beginning of the ATM data cell.

15. The asynchronous transfer mode (ATM) protocol of claim 11 wherein the step of the ATM data cell from the physical layer device to the asynchronous transfer mode (ATM) layer device comprises:

transferring the ATM data cell as a data cell which has a plurality of header bytes followed by a check redundancy code byte followed by forty-eight data bytes.

16. The asynchronous transfer mode (ATM) protocol of claim 15 wherein the step of transferring the ATM data cell as a data cell which has a plurality of header bytes followed by a check redundancy code byte followed by forty-eight data bytes comprises:

transmitting a virtual path identifier and a virtual connection identifier as a portion of the plurality of header bytes.

17. The asynchronous transfer mode (ATM) protocol of claim 11 wherein the step of transferring at least one status byte comprises:

transferring a plurality of status bytes which are eight-bits in width, each of the status bytes in the plurality of status bytes being transmitted in a serial fashion.

18. An asynchronous transfer mode (ATM) protocol comprising the steps of:

transferring a plurality of status bytes between an asynchronous transfer mode (ATM) layer device and a physical layer device;

transferring, subsequent to the step of transferring the plurality of status bytes, an ATM data cell comprising a plurality of data bytes between the asynchronous transfer mode (ATM) layer device and the physical layer device after the step of transferring the plurality of status bytes wherein the assertion of a control signal identifies a beginning of the ATM data cell.

19. An asynchronous transfer mode (ATM) protocol having a serial data stream which is eight bits wide and comprises:

at least one status byte which is used to communicate invalid physical identification information and ATM system status information between two devices in an ATM data processing system;

a physical identification byte positioned in the serial data stream at a time after a communication of the at least one status byte to identify a data routing path in the ATM data processing system; and an ATM data cell positioned in the serial data stream at a time after a communication of the physical identification byte for communicating data between the two devices in the ATM data processing system.

20. An asynchronous transfer mode (ATM) data processing system comprising:

an asynchronous transfer mode (ATM) layer circuit;
a physical layer circuit; and
a plurality of conductors coupled between the asynchronous transfer mode (ATM) layer circuit and the physical layer circuit, a subset of the plurality of conductors being used to communicate status bits between the asynchronous transfer mode (ATM) layer circuit and the physical layer circuit before transferring of an asynchronous transfer mode (ATM) data cell which corresponds to the status bits.

21. The asynchronous transfer mode (ATM) data processing system of claim 20 wherein the plurality of conductors comprise:

a transmit enable conductor coupled from the asynchronous transfer mode (ATM) layer circuit to the physical layer circuit;

a transmit data bus coupled from the asynchronous transfer mode (ATM) layer circuit to the physical layer circuit;

a transmit cell available control conductor coupled from the physical layer circuit to the asynchronous transfer mode (ATM) layer circuit; and a transmit start of cell control conductor coupled from the asynchronous transfer mode (ATM) layer circuit to the physical layer circuit.

22. The asynchronous transfer mode (ATM) data processing system of claim 20 wherein the plurality of conductors comprise:

a receive enable conductor coupled from the asynchronous transfer mode (ATM) layer circuit to the physical layer circuit;

a receive data bus coupled from the physical layer circuit to the asynchronous transfer mode (ATM) layer circuit; and a receive start of cell control conductor coupled from the physical layer circuit to the asynchronous transfer mode (ATM) layer circuit.

23. An asynchronous transfer mode (ATM) data processing system comprising:

an asynchronous transfer mode (ATM) layer circuit;
a physical layer circuit;
a transmit enable conductor coupled from the asynchronous transfer mode (ATM) layer circuit to the physical layer circuit;

a transmit data bus coupled from the asynchronous transfer mode (ATM) layer circuit to the physical layer circuit;

a transmit cell available control conductor coupled from the physical layer circuit to the asynchronous transfer mode (ATM) layer circuit;

a transmit start of cell control conductor coupled from the asynchronous transfer mode (ATM) layer circuit to the physical layer circuit;

a receive enable conductor coupled from the asynchronous transfer mode (ATM) layer circuit to the physical layer circuit;

a receive data bus coupled from the physical layer circuit to the asynchronous transfer mode (ATM) layer circuit;

a receive start of cell control conductor coupled from the physical layer circuit to the asynchronous transfer mode (ATM) layer circuit, wherein the transmit data bus and the receive data bus are used to communicate status bits followed by an ATM fifty-three byte data cell wherein a start of the ATM fifty-three byte data cell is identified by an assertion of one of either the transmit start of cell control conductor or the receive start of cell control conductor depending upon whether receiving or transmitting is occurring with respect to the asynchronous transfer mode (ATM) layer circuit.

24. The asynchronous transfer mode (ATM) data processing system of claim 23 wherein the asynchronous transfer mode (ATM) data processing system comprises:

a transfer parity conductor coupled from the asynchronous transfer mode (ATM) layer circuit to the physical layer circuit.

25. The asynchronous transfer mode (ATM) data processing system of claim 23 wherein the asynchronous transfer mode (ATM) data processing system comprises:

a receive parity conductor coupled from the physical layer circuit to the asynchronous transfer mode (ATM) layer circuit.

* * * * *